Patented Oct. 14, 1930

1,778,174

UNITED STATES PATENT OFFICE

KARL THIESS, ERNST RUNNE, KARL MOLDAENKE, AND THEODOR MEISSNER, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

SUBSTITUTED ISATINS AND PROCESS OF PREPARING THEM

No Drawing. Application filed June 6, 1929, Serial No. 368,998, and in Germany May 30, 1926.

Our present invention relates to 5-halogen-7-alkoxy-isatins substituted 4-position by halogen or alkyl.

7-alkoxy-isatins having 2 more substituents in the benzene nucleus, such as halogen or alkyl, have not been known hitherto.

Now we have found that it is easy to obtain 5-halogen-7-alkoxy-isatins being substituted in 4-position by halogen or alkyl by treating 7-alkoxy-isatins of the following formula:

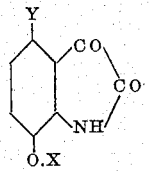

wherein
Y stands for alkyl or halogen,
X for alkyl,
with a halogenating agent. The halogen enters the 5-position.

The halogenation can be effected by causing halogen or substances developing halogen, as for instance sulfuryl chloride, to act upon the isatins themselves or upon bisulfite derivatives thereof. The reaction advantageously is carried out in inorganic or organic solvents or diluents, such as water, sulfuric acid, glacial acetic acid, carbon-tetrachloride or the like, with or without addition of a catalyst as for instance iodine, potassium iodide, iron or the like. Since, by halogenating, in many cases the isatin derivative halogenated at the nitrogen atom is obtained as intermediate product, the latter can be first produced and subsequently be transformed into the derivative halogenated in the nucleus.

By this reaction new, hitherto unknown, isatins of the following general formula:

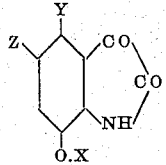

wherein
X stands for alkyl,
Z for chlorine or bromine and
Y for alkyl or halogen, are obtained. They are in general well crystallized bodies and are important intermediate products for the manufacture of dyestuffs.

The following example illustrates our invention; the parts being by weight:

1. 191 parts of 4-methyl-7-methoxyisatin melting at 238° C.–240° C. are entered into 1000 parts of glacial acetic acid. The quantity of chlorine necessary for the introduction of one chlorine atom is introduced at ordinary temperature, while stirring, during which process the temperature rises to 35° C. The red reaction product is filtered by suction, first washed with glacial acetic acid and then with water until it shows a neutral reaction.

The 4-methyl-5-chloro-7-methoxyisatin thus obtained crystallizes from glacial acetic acid in the form of red needles melting at 251° C.–253° C.

2. In the same manner there is obtained from the 4-methyl-7-ethoxy-isatin melting at 187° C.–188° C. the 4-methyl-5-chloro-7-ethoxy-isatin melting at 211° C.–213° C.

3. By subjecting 4-chloro-7-methoxy-isatin melting at 240° C. to the treatment set forth in Example 1 there is obtained 4.5-dichloro-7-methoxy-isatin melting at 274° C.–275° C.

4. 21 parts of 4-chloro-7-methoxy-isatin are dissolved in 400 parts of hot water and the necessary quantity of sodium bisulfite. After the solution has been allowed to cool and chlorine has been introduced at ordinary temperature 0.2 parts of potassium iodide are added. When the chlorination is finished, the solution is acidified by adding hydrochloric acid, boiled for one hour and the 4.5-dichloro-7-methoxy-isatin after being filtered by suction is recrystallized from glacial acetic acid. This isatin is identical with the product obtainable according to Example 3.

5. 160 parts of bromine are run at a temperature of between 10° C. and 15° C, into a solution of 191 parts of 4-methyl-7-methoxy-isatin and 1000 parts of glacial acetic acid. The whole is stirred for a considerable time while heating, finally to 80° C.–100° C. after the solution has been allowed to cool the reaction product is filtered by suction, washed with water and recrystallized from glacial acetic acid. The 4-methyl-5-bromo-7-methoxy-isatin thus obtained melts at 252° C.–254° C.

The bromination can also be effected, for instance, in sulfuric acid.

We claim:

1. As new products, compounds of the following general formula:

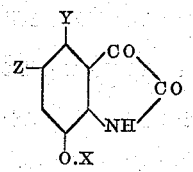

wherein X stands for alkyl, Z stands for chlorine or bromine and Y for alkyl or halogen.

2. As new products, compounds of the following general formula:

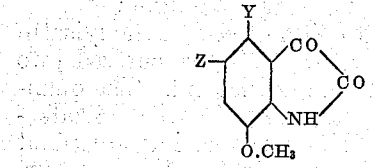

wherein Z stands for chlorine or bromine and Y for alkyl or halogen.

3. As new products, compounds of the following general formula:

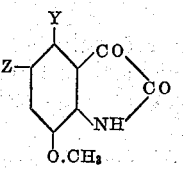

wherein Z stands for chlorine or bromine and Y for methyl or chlorine.

4. As a new product, 4-methyl-5-chloro-7-methoxy-isatin crystallizing from glacial acetic acid in red needles melting at 251° C.–253° C.

In testimony whereof, we affix our signatures.

KARL THIESS.
ERNST RUNNE.
KARL MOLDAENKE.
THEODOR MEISSNER.